(12) United States Patent
Deschamps et al.

(10) Patent No.: US 6,513,347 B1
(45) Date of Patent: Feb. 4, 2003

(54) HEAT CONDITIONING PROCESS

(75) Inventors: Arnaud Deschamps, Bievres (FR); Willi Mueller, Grabs (CH); Stephan Rhyner, Buchs (CH); Aitor Galdos, Vaduz (LI)

(73) Assignee: Balzers Hochvakuum AG, Truebbach (CH)

(*) Notice: Subject to any disclaimer, the term of this patent is extended or adjusted under 35 U.S.C. 154(b) by 0 days.

(21) Appl. No.: 09/481,392

(22) Filed: Jan. 12, 2000

Related U.S. Application Data

(63) Continuation-in-part of application No. 09/104,932, filed on Jun. 26, 1998, now abandoned.

(51) Int. Cl.⁷ ............................................. C03B 32/00
(52) U.S. Cl. ...................... 65/29.1; 65/32.1; 65/33.2; 65/157; 65/350
(58) Field of Search .................. 65/29.1, 32.1, 65/32.4, 33.2, 60.1, 60.4, 157, 349, 350

(56) References Cited

U.S. PATENT DOCUMENTS

| | | | | |
|---|---|---|---|---|
| 3,615,317 A | * | 10/1971 | Jagodzinski et al. | 501/57 |
| 3,793,167 A | * | 2/1974 | Glaser | 118/726 |
| 5,500,031 A | | 3/1996 | Atkins et al. | |
| 5,515,986 A | * | 5/1996 | Turlot et al. | 216/71 |
| 5,674,304 A | * | 10/1997 | Fukada et al. | 427/108 |
| 5,693,238 A | | 12/1997 | Schmitt et al. | |

FOREIGN PATENT DOCUMENTS

| | | |
|---|---|---|
| EP | 0 610 556 | 8/1994 |
| WO | 90 00306 | 12/1997 |

OTHER PUBLICATIONS

Database WPI Section Ch, Week 9739, Derwent Publ. Ltd., London, GB, AN 97–422490 XP002113816 & JP 09 190981 A (Kokusai Kenki KK), Jul. 22, 1997—Abstract.

* cited by examiner

*Primary Examiner*—Sean Vincent
(74) *Attorney, Agent, or Firm*—Crowell & Moring LLP

(57) ABSTRACT

For heat conditioning flat panel glass substrates the substrates are directly exposed in vacuum to the radiation of lamps, the lamps being selected so that their spectral radiation characteristics (b, c) fit with the absorption characteristics (a) of the glass of the substrate.

54 Claims, 3 Drawing Sheets

# HEAT CONDITIONING PROCESS

Figure 1:
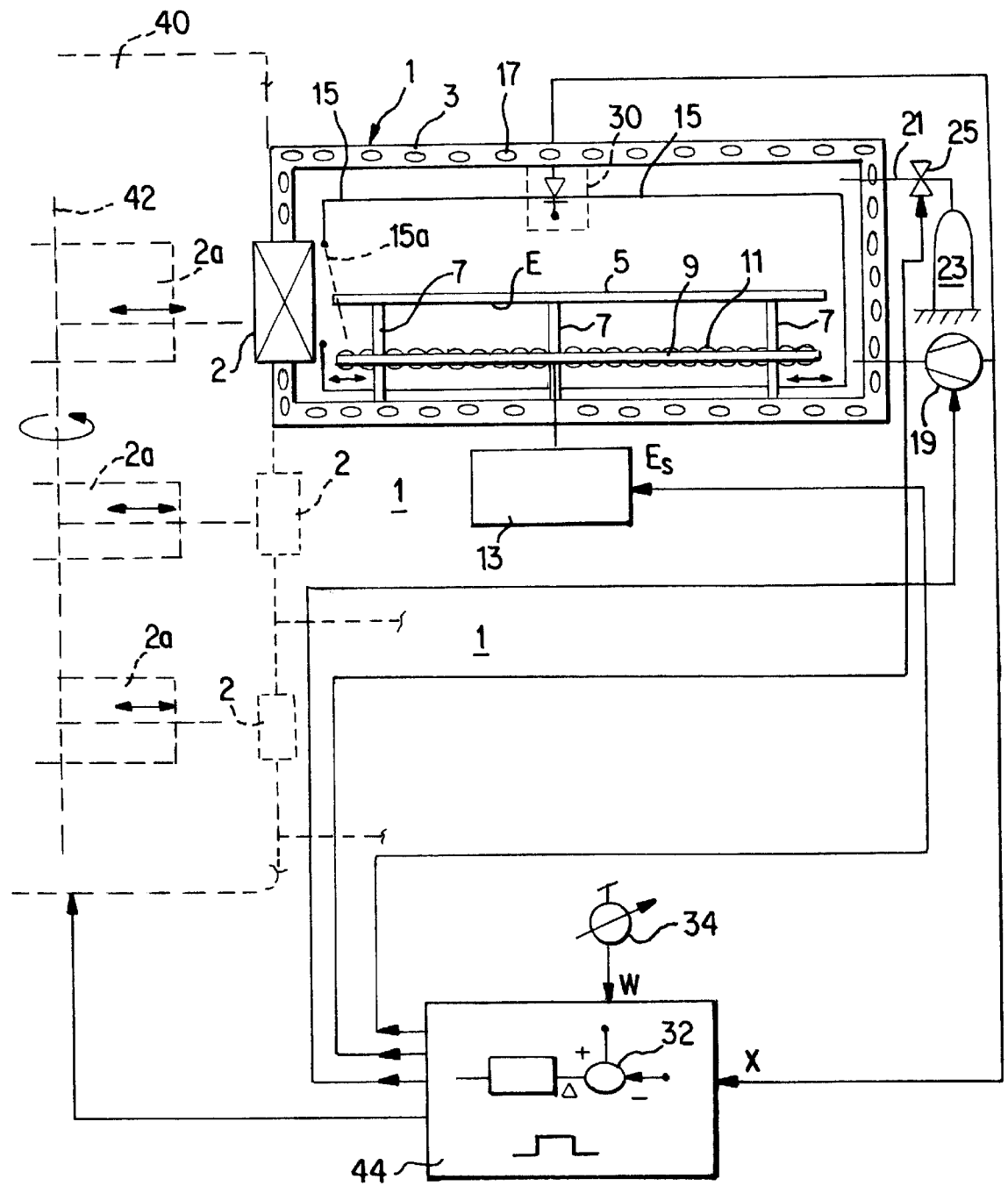

This is a continuation-in-part application of U.S. patent application Ser. No. 09/104,932, filed Jun. 26, 1998 now abandoned.

BACKGROUND OF THE INVENTION

The present invention is directed to a technique for heat conditioning glass substrates, which are subsequently surface treated by vacuum surface treatment. The invention departs from requirements which are encountered when large glass substrates for display panel production from 300 cm$^2$ up to 1 m$^2$ and more have to be heat conditioned.

PRIOR ART

For subsequent vacuum coating surfaces of glass substrates in the flat panel industry, as by aluminum sputtering, water molecules must previously have been removed from the surface of the substrate. This is customarily performed by heating which additionally degases and cleans the surfaces from further surface contaminations.

To perform such heat conditioning it is known to convey a multitude of substrates into an oven which is heated e.g. up to 250° C. The oven is operated at vacuum atmosphere. Thereby, considerable time lapses, until the substrates reach the final desired temperature. So as not to deteriorate the high throughput of the overall vacuum processing plants by such low-speed process, a multitude of substrates must be heat conditioned simultaneously, whereas other processes of the overall processing plant are performed in single substrate mode. Thus, one can say the single processed substrates are-collected for heating. If other processes of the plant operate in batch mode, each batch then representing one workpiece, the described approach necessitates accordingly multiple batch heating.

SUMMARY OF THE INVENTION

It is a prime object of the present invention to provide for a heat conditioning process and heat conditioning chamber by which an improved heating rate of the glass substrate is achieved compared with prior art attempts, so that, especially in a cluster-type processing vacuum plant, heat-conditioning may be performed by single substrate operation without limiting overall throughput of the plant. Thus, the inventive technique shall fully comply in time consumption with single workpiece treatment, be it single substrate treatment or single batch treatment, where "a batch" is considered as "one workpiece" with respect to heat treatment. This object is realised by the inventive process for heat conditioning at least one glass substrate for subsequent surface treatment by at least one vacuum surface treatment process, as for subsequent vacuum coating, which inventive process comprises the steps of introducing said substrate into a chamber;

having said chamber evacuated before the introducing or evacuating said chamber after the introducing;

predetermining the spectral absorption characteristics of the substrate in the infrared spectral band and including its lower slope, where absorption rises with increasing wavelength;

selecting at least one lamp with a radiation spectrum band overlapping said absorption spectrum of said substrate at least along a predominant part of the slope and/or towards longer wavelengths;

exposing the substrate in the evacuated chamber to radiation from the lamp directly via the evacuated atmosphere of said chamber.

The infrared spectral band is here defined by $$500\ nm \leq \lambda \leq 10000,$$

wherein λ is the wavelength of light.

In a preferred mode of the inventive process a lamp is selected with a radiation peak at a wavelength $\lambda_r$, $$1500\ nm \leq \lambda_r,$$

thereby there is preferred $$1500\ nm \leq \lambda_r \leq 6000\ nm,$$

thereby especially $$2000\ nm \leq \lambda_r \leq 6000\ nm,$$

and especially preferred $$2500\ nm \leq \lambda_r \leq 4500\ nm.$$

It is further preferably proposed to reflect radiation transmitted through the substrate back towards the workpiece, so as to minimise thermal loss.

Also it would be possible to provide therefor a rigid structure with a reflecting surface, in a further preferred form of realisation reflecting is performed by means of a foil-like or mise thermal lose. The material of the reflecting surface is thereby preferably selected so as to reflect light in the radiation spectral band of the lamp to at least 50%, even to at least 80%, thereby absorbing minimal energy. As material of a reflecting surface preferably aluminum is selected. In combination with such Aluminum $\lambda_r$ should be selected above 1500 nm to minimise absorption of lamp radiation and thus to minimise system inertia.

Especially with Aluminum as material of the reflecting surface more than 99% of radiation in the near infrared and infrared spectral band may be reflected and approx. 90% of radiation in the visible spectral range.

In spite of the fact that double-side direct exposure to respective lamps is possible in a preferred mode, heating the substrate is performed by direct exposure to the lamp radiation from one side and reflecting radiation from the other side back to the substrate, which has the advantage that the substrate is thermically loaded substantially equally and more efficiently from both sides, which prevents thermal stress warping and deterioration of the substrate by inhomogeneous heat loading.

Thereby it must be emphasised that thermal gradients in the substrate would lead to different magnitude expansion within the substrate, thereby leading to bending of the glass up to breakage. This is clearly to be avoided.

To further prevent overheating of the reflector arrangement, in a further preferred mode the reflector arrangement, and especially a foil-like or sheet-like reflector arrangement, is cooled from its side unexposed to the radiation from the lamp. This is preferably performed via a rigid chamber wall distant from and adjacent to the reflector arrangement and fluid-cooling the rigid wall, which is preferably made of stainless steel. This cooling effect is preferably further improved by providing a black-body radiation coating on that side of the reflector arrangement which is not exposed to the radiation of the lamp.

So as to improve heating homogeneity along the substrate, especially along a large substrate, it is proposed to provide more than one lamp and to preferably provide such lamps at respectively selected different mutual distances, which distances are preferably adjustable.

Up to now the present invention was optimised with respect to heating efficiency. Nevertheless, cooling efficiency may be as important as heating efficiency in view of the overall heat conditioning treatment cycles. To optimise cooling efficiency the heat transfer mechanism is—for cooling—switched to completely different physics, namely from radiation heating to conductance cooling. In a preferred mode of operating in the cooling cycle, a heat conducting gas, as preferably a noble gas, as especially Helium, is introduced into the treatment chamber. Especially as the outer wall of the chamber is cooled, heat conductance leads to rapid decrease of substrate temperature.

With respect to evacuating the treatment chamber it is recommended—for heating operation—to pump it down to a vacuum where heat conductance practically ceases. This to avoid thermal losses to the surrounding and to rise heating efficiency. Further, the lamp is preferably positioned beneath the substrate to prevent particle contamination of the substrate. The heating rate may be controlled by means of a negative feedback control loop, thereby using preferably a pyrometer sensor directed towards the substrate to detect its actual thermal state to be compared with a desired thermal state value. The resulting comparison result, as a control difference, acts on the lamp control to adjust its power and/or thereby especially to shift its radiation spectrum, and/or on a gas inlet control valve so as to control thermal conductivity and thus thermal loss and/or on the control of an evacuating pump. It has to be noted that by controlling the electrical supply of the lamps their radiation spectrum may be shifted, which again leads to adjustments of the thermal state of the substrate.

We recommend the use of so-called "black-type lamps" sold by the firm USHIO Inc. or of carbon-radiator lamps as available from the firm HERAEUS Inc.

Thus, more generically halogen lamps are preferred with a black coating on the glass bulb. Thereby transformation of energy in the visible spectral range or in the near infrared range is transformed in energy in the infrared spectral band.

With respect to selection of aluminum as reflecting material it has to be noted that it has an absorption maximum at around 800 nm, but has up to 99% of reflectance beyond 2000 nm, which is optimum, as glass begins to absorb at around 2500 nm. The "black-type" lamps mentioned above have a maximum of radiation spectral band at about 4000 nm, depending on their surface temperature, the carbon radiator lamps at about 2000 nm well matched with the absorption characteristics of glass used for flat panels au of Corning glass. The carbon radiator lamp has the further advantage that the response time is shorter and its behaviour, with respect to low particle generation, is better.

Further, the technique of cooling the chamber walls leads to a thermal stable reference for the overall heating system control.

With the inventive process and accordingly with the inventive chamber it was possible to repeatedly and reliably heat Borosilicat glass substrates with a surface of at least 300 $cm^2$ up to 1 $m^2$ from room temperature to 200° C. in 50 sec. without significant temperature overshoot and with an excellent distribution of temperature along the substrate surface. Temperature overshoot was at most 10%, normally quite lower.

As water and oxygen, which are mainly present at the surface of unconditioned substrates, start to desorb at about 130° C., with the high heating rate mentioned, it is possible to degas the surfaces at least to a very high extent in a very short time, which is rather shorter than previously or subsequently performed treatment processes in a cluster-type flat panel producing plant.

Back to the inventive chamber, to fulfil the above mentioned object it comprises a rigid outer wall with at least one input/output lock or at least one input and at least one output lock, a workpiece holder arrangement within the chamber, a vacuum pumping arrangement operationally connected to the chamber, at least one lamp opposite said workpiece holder arrangement and freely accessible from said workpiece holder, said lamp having a radiation spectrum band overlapping the absorption spectrum band of glass at least along a predominant part of the absorption slope of said band of said glass where absorption rises with increasing wavelength and/or at longer wavelengths.

Further preferred features of the invention will now be described by examples with the help of figures. Therein, it in shown:

SHORT DESCRIPTION OF THE FIGURES

Figure 2:
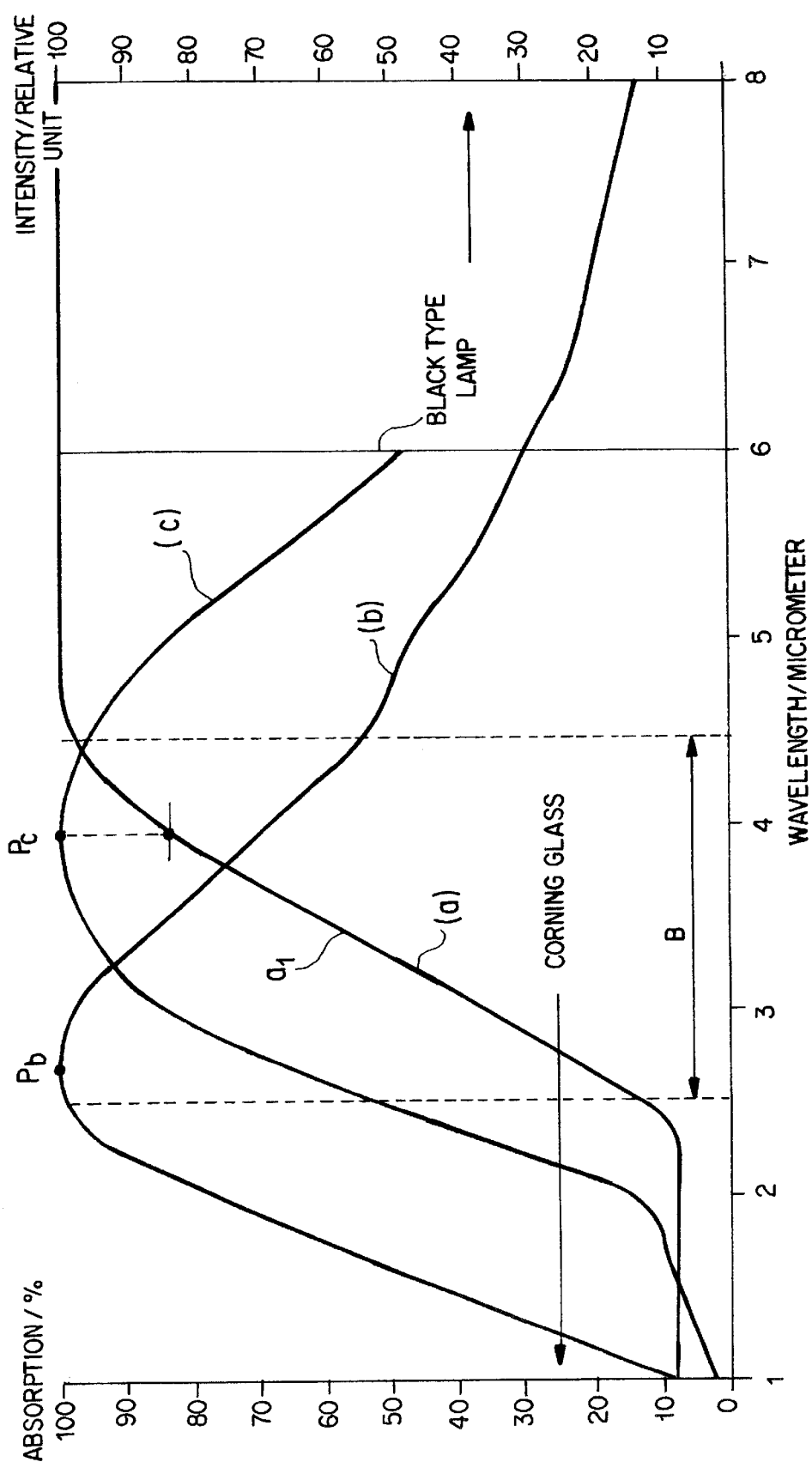
Figure 3:
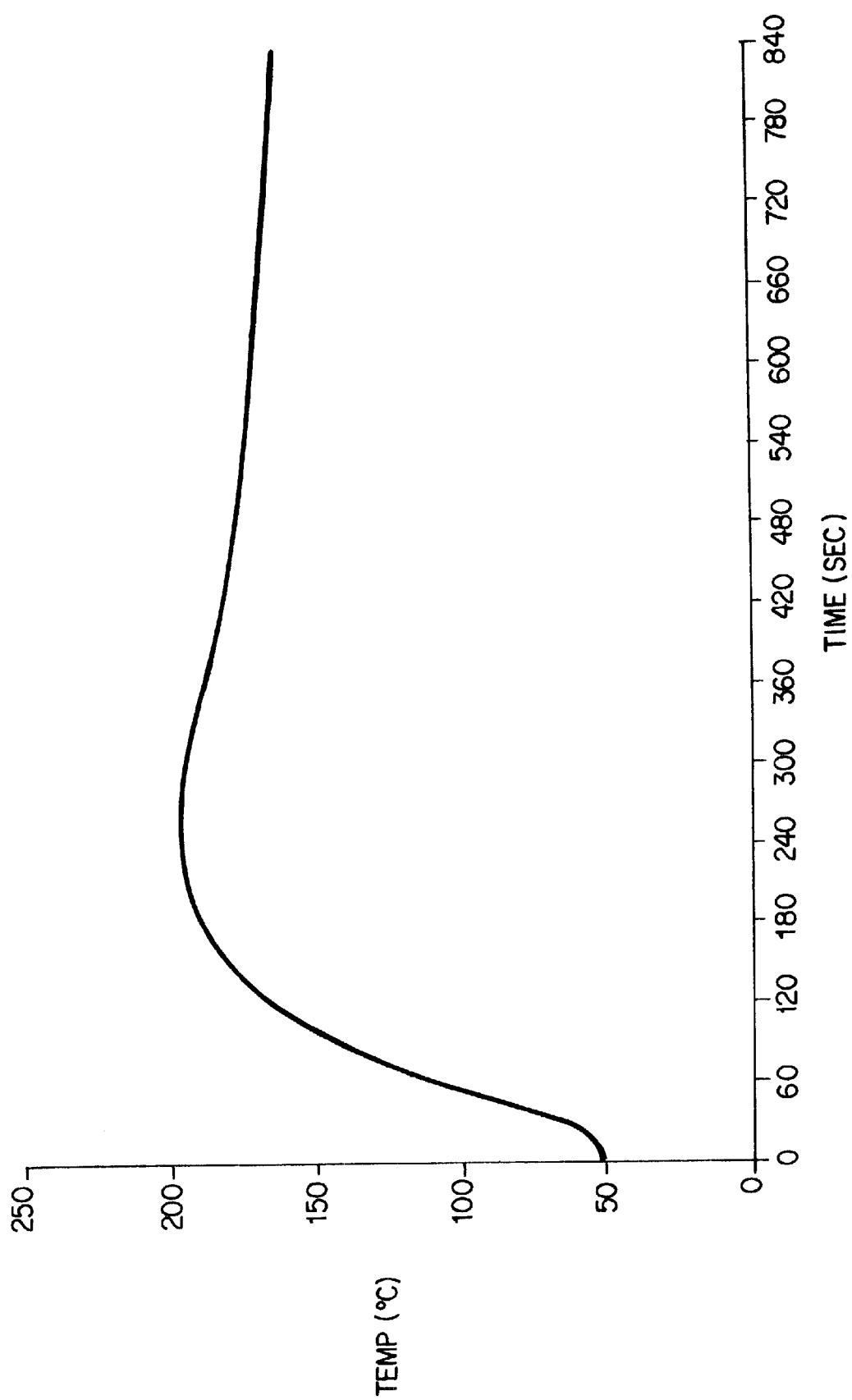

FIG. 1 schematically a preferred realisation form of a heating chamber according to the present invention and operating according to the process according to the invention;

FIG. 2 absorption and radiation behaviour of glass and lamp heater as exploited in a preferred embodiment of the inventive chamber and process;

FIG. 3 the resulting temperature response of a 550×650 $cm^2$ glass substrate heated according to the inventive process from ambient cold temperature and within an inventive heating chamber.

DETAILED DESCRIPTION OF PREFERRED EMBODIMENT

According to FIG. 1 an inventive heating vacuum chamber 1 comprises a surrounding rigid wall 3 defining in the preferred form as shown for a flat box-shaped or drawer-shaped chamber. The interior of the chamber 1 is accessible for feeding and removing a glass substrate 5 via an input/output lock as e.g. realised by a slot valve.

The substrate 5 is deposited within chamber 1 on a holder arrangement which is formed by a predetermined number of pins 7, according to the size of the substrate 5, which pins are of a thermically resistant, thermically isolating material, as of a polymer material. As will be later explained, the holder arrangement and especially the pins 7 are provided with a reflective outer layer, the characteristics of the reflecting layer as especially of Aluminum being substantially equal to that of a reflecting arrangement as previously described.

Beneath the deposition plane E for the substrate 5, as defined by the pins 7, there is mounted in the chamber a lamp holder 9 carrying a multitude of lamps 11, preferably of Halogen-type lamps with a black coating on its quartz tubes, so-called "black-type" lamps or of carbon-radiator lamps as was defined in the introductory part of the description. The mutual distance of the lamps is as an example about 2 to 4 cm.

Electrical supply leads and fixation of the lamp holder 9 may be combined with the pins 7. As schematically shown the lamps 11 are electrically driven by a power supply unit 13.

Especially opposite to the lamps 11 with respect to plane E, but preferably all around the rigid wall 3, distant therefrom by e.g. 5 to 10 mm and adjacent thereto there is provided a reflector arrangement 15 made of thin metal sheet material, i.e. of foil-like material. As shown at 15a the "inner" chamber formed by the reflector 15 may if necessary comprise a shutable reflecting door 15a towards the input/output lock 2.

The rigid wall 3, as was mentioned preferably made of stainless steel, comprises an arrangement of channels 17 for a cooling medium, as e.g. and preferred for water. Further, the reflector 15 preferably comprises at its rearside 15$_r$ a black-body radiating coating, as e.g. comprising graphite or black-coloured anodised Aluminum.

As further schematically shown the chamber is evacuated by means of a pumping arrangement 19, which is either directly coupled to the inside of the chamber or which may be provided in a chamber operationally connected to the lock 2. There is further provided a gas inlet 21 from a gas tank arrangement 23 with a heat conducting gas, preferably with Helium to the inside of chamber 1 provided with a flow control valve 25.

The heat conducting gas is inlet into chamber 1 preferably after the lamps are disabled, so as to reduce cooling time and thereby preventing any danger of arcing or of plasma generation Functioning of the inventive chamber and according to the inventive process shall now be described additionally with the help of FIG. 2. In FIG. 2 curve (a) shows, as an example, the absorption spectrum characteristic of glass as used for flat panel production, so e.g. of Corning glass. This absorption spectrum (a) shows a slope at $a_1$, where the absorption rises as a function of increasing wavelength λ. It might be seen that the slope $a_1$ occurs in a band between 2000 nm and 5000 nm in this specific case and even more precisely between 2500 nm and 4500 nm, as indicated by band B.

The characteristic (b) shows the radiation spectrum of a lamp, as e.g. of a black type lamp or a carbon-radiator lamp. It may be seen that such lamp may have a radiation spectrum peak $P_b$ at about 2500 nm (carbon lamp: peak at about 1800 nm), so that the radiation spectrum of that lamp overlaps the absorption spectrum (a) at least along a predominant part of slope $a_1$. The characteristic (c) is the radiation characteristic of another lamp as defined above, having a peak of radiation $P_c$ at about 4000 nm. This lamp shows a radiation maximum at a wavelength at which the glass absorbs more than 50% , as shown even more than 80% . Both kinds of lamps, possibly in combination, are preferably provided as lamps 11 in the inventive chamber as shown in FIG. 1. The desired characteristic of the lamps can be selected within the above mentioned range according to the desired relation absorption/transmission of the glass substrate.

Selection of the lamp may additionally be influenced by coating already deposited on the glass substrate.

The reflecting surface of reflector 15 and of the pins 7 is thereby preferably selected to reflect as much as possible light in the radiation spectrum of the respectively selected lamp, i.e. significantly more than 50%, even more than 80%, thereby minimising absorption.

At an evacuated chamber 1 the substrate 5 is heated by absorbing the radiation of the lamps provided, thus at least predominantly by radiation heating. By provision of the reflector 15, especially opposite to the lamps 11, radiation transmitted through the glass of the substrate 5 is reflected back to the substrate 5, so that the substrate becomes radiation-heated from both sides, which significantly improves homogeneity of thermal loading and minimises thermal stress and deformation of the substrate.

Cooling of the rigid wall 3 on one hand prevents overheating of the preferably thin reflector arrangement 15 and provides for a stable reference temperature for the process, especially for its control.

To enhance radiation of the reflector arrangement 15 towards the cooled wall 3 of the chamber, there might be provided, as was said, a black-body radiating coating 15$_r$.

To further improve homogeneity of thermal loading of the substrate 5, especially at its border areas and thereby especially in front of the slot valve, the lamps 11 are arranged or are adjustable with mutual different distances, as shown with the double-arrows d, so that especially heating of the substrate's border area may be increased, or a predetermined temperature profile can be realised.

Besides of radiation, heat conductance may affect heating of the substrate 5. Nevertheless, such heat conductance leads to overall thermal flow on one hand to the substrate 5 and on the other hand to the reflector and the cooled wall 3. Thus, it might be seen that depending on the degree of vacuum installed in chamber 1 radiation and conductance with accordingly different ratios will lead to a desired thermal equilibrium and thus final temperature of substrate 5. Heat conductance may thereby be influenced by means of controlling valve 25 and the amount of an inert gas like a noble gas as of Argon or especially of Helium introduced from tank arrangement 23 into the chamber 1.

As shown schematically and in dashed lines at 30, there is preferably provided a detector detecting the actual thermal state of the substrate 5, as preferably a pyrometer. The output thereof is led to an X input of a comparing unit 32, the other input W of unit 32 being fed from an adjustable signal source 34 with a rated value signal. According to the negative feed-back control deviation Δ at the output of comparing unit 32 the thermal state of substrate 5 is controlled on a value according to the rated value at W by adjusting at least one of the following parameters:

electric supply $E_s$ to the lamps 11, adjustment of affecting radiated overall energy and/or shifting the radiation spectrum of the lamp and thus the amount of energy absorbed by the substrate 5;

amount of heat conductive gas inlet by adjustment of valve 25, which amount varying heat conductance and thus thermal loss of the arrangement during substrate heating cycle;

controllable pumping arrangement 19 which influences pressure within chamber 1 and thus the quotient of heat radiation to heat conductance.

In FIG. 3 there is schematically shown the temperature curve of a glass substrate 5 of 550×650 cm². The temperature was measured when inventively processing the substrate in a chamber according to FIG. 1. The curve thereby shows the resulting temperature/time-course at a predetermined, e.g. central point of the substrate. It may clearly be seen that after lighting the lamps the temperature of the substrate homogeneously rise quickly to a stable, desired temperature, according to FIG. 3 of about 180° C. When the lamps are kept on lighted and an initial warming up time span is thereby omitted, it was even possible to homogeneously heat up a substrate of the said dimension and even larger within 50 seconds to a stable end temperature of about 200° C. This means more than three times faster than by known prior art arrangements.

For cooling down the substrate, if necessary, heat conducting gas is inlet via valve 25 of FIG. 1, so that heat is removed from the substrate by conductance to the cooled wall 3. It might thereby be advisable to adjust the electric supply of the lamps, either to at least diminish their radiation power and/or to shift their radiation spectral band towards lower wavelengths according to FIG. 1 to thereby reduce radiation heating during cooling down cycles. It is especially recommended to at least lower the electric power to the lamps.

The inventive chamber 1 is perfectly suited to be used and applied in an overall cluster-type treatment plant for producing flat panels for display applications. This is shown in dotted lines in FIG. 1. Thereby, several chambers 1 of a flat-box or drawer-like shape are stapled one above the other. A central handling chamber 40 with a central handling robot 42 serves the input/output locks 2 of the inventive heating chambers as well as staples of further processing, box-like or drawer-like chambers, as of coating chambers, via respective locks 2a. As characteristic for a cluster-type plant, according to the manufacturing process desired, different types of processing chambers are arranged around the central handling chamber 40, respective staples being formed by equal chambers. There is provided a central control unit 44 which may, as shown in FIG. 1, also incorporate parts of the negative feedback temperature control loop for the substrates 5, which unit 44 further controls process sequence and process timing of the different processes provided and performed grouped around the central handler 40. Thereby, preferably processing sequence and process timing is freely programmable at unit 44 to get utmost flexibility to adjust for different manufacturing process sequences.

Instead of single glass substrate or batches of single glass, substrates possibly already coated by predominantly not reflecting layers may be arranged in a double or even multiple stacked manner, i.e. one upon the other in back-to-back relation whereby such a stack is treated as was described for a single substrate.

By means of pyrometer temperature measurement a very accurate open- or closed-loop temperature control may be realised.

Inventively there is realised very fast heating and if necessary fast cooling, thereby enabling such advantages with a low-weight, quite simply construed and easily controllable chambers. Thereby, maintenance of such chambers is easily and rapidly performed, which significantly improves efficiency of an overall treating plant.

With respect to a preferred overall plant layout incorporating the inventive heating chamber, we especially draw the attention on the following patents and patent application of the same applicant:

U.S. Pat. No. 5,515,986
U.S. Pat. No. 5,693,238
U.S. application Ser. No. 08/784,578

What is claimed is:

1. A process for heat conditioning at least one glass substrate for subsequent surface treatment by at least one vacuum process, comprising the steps of:
   introducing said substrate into a chamber;
   having said chamber evacuated before said introducing or evacuating said chamber after said introducing;
   predetermining the spectral absorption characteristics of said substrate in the infrared spectral band, including its lower slope where absorption rises with increasing wavelength;
   selecting at least one lamp with a radiation spectrum band overlapping said absorption spectrum of said substrate at least along at least one of a predominant part of said slope and at longer wavelengths;
   exposing said substrate in said evacuated chamber to radiation from said lamp directly via the evacuate atmosphere of said chamber, and
   cooling said workpiece within said chamber by introducing a heat conductive gas into said chamber to achieve heat conductance from said substrate to the wall of said chamber.

2. A heating chamber for at least one glass substrate, comprising a rigid out wall with at least one input/output lock or at least one input and at least one output lock; a substrate holder within said chamber with a substrate deposition plane, a vacuum pumping arrangement operationally connected to said chamber, at least one lamp opposite said plane and freely accessible from said plane, said lamp having a radiation spectrum band overlapping the absorption spectrum of said glass substrate at least along a predominant part of its lower slope, where absorption rises with increasing wavelength and longer wavelengths, said chamber being connected via a controllable valve arrangement to a gas tank with a heat conducting noble gas.

3. The chamber of claim 2, further comprising a control unit, the control unit being operationally connected to said valve arrangement for disabling said gas to penetrate into said chamber whenever said substrate is to be heated, and for enabling flow of said gas into said chamber whenever said substrate is to be cooled down.

4. A method for manufacturing surface treated glass substrates, comprising
   (a) predetermining spectral absorption characteristics of a glass substrate in the infrared spectral band including its lower slope, where absorption rises with increasing wavelength;
   (b) introducing the glass substrate into a chamber;
   (c) evacuating said chamber before or after introducing;
   (d) exposing said substrate in said evacuated chamber to radiation from at least one lamp directly via the evacuated atmosphere of said chamber;
   (e) operating said at least one lamp with a radiation spectrum band overlapping an absorption spectrum of said substrate at least one of along a predominant part of said slope and at longer wavelengths in a wavelength band adjacent to said slope, and with substantially reduced radiation spectrum at wavelengths below said slope; and
   (f) performing, subsequently to step (d), a vacuum surface treatment of said substrate.

5. The method of claim 4, wherein step (d) comprises selecting said at least one lamp to have a radiation spectrum maximum at a wavelength within said slope or within said wavelength band adjacent to said slope.

6. The method of claim 4, wherein step (d) comprises selecting said at least one lamp to have a radiation spectrum maximum at a wavelength at which said absorption has reached at least 50%.

7. The method of claim 4, wherein step (d) comprises selecting said at least one lamp to have a radiation spectrum maximum at a wavelength at which said absorption has reached at least 80%.

8. The method of claim 4, wherein step (d) comprises selecting said lamp with a peak of said radiation spectrum at a wavelength $\lambda_r$ in which $$1500\ nm \leq \lambda_r.$$

9. The method of claim 8, wherein $$1500\ nm \leq \lambda_r \leq 6000\ nm.$$

10. The method of claim 9, wherein $$2000\ nm \leq \lambda_r \leq 6000\ nm.$$

11. The method of claim 10, wherein $$2500\ nm \leq \lambda_r, 5000\ nm.$$

12. The method of claim 9, further comprising selecting said wavelength $\lambda_r$ to be at least about one of 2500 nm and of 45 nm.

13. The method of claim 4, further comprising reflecting radiation transmitted through said substrate back towards said substrate.

14. The method of claim 13, wherein said reflecting is effected by a foil reflector so as to minimize thermal capacity of said reflector.

15. The method of claim 13, further comprising selecting a material providing a surface to reflect said radiation transmitted through said substrate back towards said substrate by more than 50%.

16. The method of claim 15, wherein the step of selecting said material provides said surface to reflect said radiation by more than 80%.

17. The method of claim 16, where in the step of selecting said material provides said surface to reflect said radiation by more than 90%.

18. The method of claim 17, wherein said radiation is reflected by an aluminum surface, and said lamp is selected so that radiation thereof is substantially reflected without absorption at said aluminum surface.

19. The method of claim 17, further comprising providing a reflector for said reflecting and cooling said reflector from a side thereof unexposed to said lamp.

20. The method of claim 19, wherein said cooling is performed via a rigid and fluid-cooled chamber wall adjacent to and distant from said reflector.

21. The method of claim 20, further comprising providing said side unexposed to said lamp of said reflector with a black body radiating coating.

22. The method of claim 4, further comprising cooling said substrate within said chamber by introducing a heat conductive gas into said chamber to achieve heat conductance from said substrate to a wall of said chamber.

23. The method of claim 4, further comprising providing more than one of said at least one lamp and controlling heating distribution along said at least one substrate by respectively selecting the mutual distance between said lamps.

24. The method of claim 4, further comprising providing said at least one lamp underneath said substrate or providing said at least one lamp above and underneath said substrate.

25. The method of claim 4, wherein said at least one lamp is selected to be a black lamp.

26. The method of claim 4, wherein said substrate has a surface area of at lest 300 cm$^2$.

27. The method of claim 26, wherein said substrate has a surface area of at lest 500 cm$^2$.

28. The method of claim 26, further comprising selecting said chamber as a cluster of a cluster plant and performing said surface treatment within a further cluster of said cluster plant.

29. The method of claim 28, further comprising programming at least one of timing and sequence of said cluster plant according to specific requirements for said substrate.

30. The method of claim 4, comprising manufacturing a display panel glass substrate.

31. A heating chamber for at least one glass substrate having an absorption spectrum with a lower slope where absorption rises with increasing wavelength and an absorption band adjacent to said slope and at higher wavelengths, said chamber comprising a rigid outer wall with at least one input and output lock or with at least one input and at least one output lock, and a substrate holder within said chamber with a substrate deposition plane, a vacuum pumping arrangement operationally connected to said chamber, and at least one lamp opposite said plane and freely accessible from said plane, wherein said lamp is configured to operate so as to have a radiation spectrum band overlapping at least one of said absorption slope of said substrate and said absorption band, and with substantially reduced radiation spectrum at wavelengths below said slope.

32. The chamber of claim 31, wherein said lamp has a radiation spectrum maximum at a wavelength of one of said slope and said absorption band.

33. The chamber of claim 32, wherein said radiation spectrum maximum is at a wavelength where said absorption along said slope has reached at least 50%.

34. The chamber of claim 33, wherein said radiation spectrum maximum is at a wavelength where said absorption along said slope has reached at least 80%.

35. The chamber of claim 31, further comprising a reflector arrangement in said chamber opposite to said at least one lamp with respect to said substrate holder, the material of said reflector arrangement reflecting light in said radiation spectrum band of said lamp by more than 50%.

36. The chamber of claim 35, wherein said material reflects more than 80% of light in said radiation spectrum of said lamp.

37. The chamber of claim 35, wherein said material is aluminum.

38. The chamber of claim 35, wherein said reflector arrangement comprises a foil reflection member adjacent and distant from said wall of said chamber.

39. The chamber of claim 35, wherein a rear side of said reflector arrangement is provided with a black body radiating coating.

40. The chamber of claim 35, wherein said reflector arrangement is configured to be cooled.

41. The chamber of claim 31, wherein said wall of said chamber comprises a channel arrangement for a cooling medium.

42. The chamber of claim 31, wherein said at least one lamp is a plurality of lamps in which a distance between adjacent lamps is different from other adjacent lamps.

43. The chamber of claim 31, wherein said at least one lamp is a plurality of lamps in which a distance between the lamps is selectively adjustable.

44. The chamber of claim 31, wherein said at least one lamp is provided beneath said plane.

45. A heating chamber for at least one glass substrate having an absorption spectrum with a lower slope where absorption rises with increasing wavelength and an absorption band adjacent to said slope and at higher wavelengths, said chamber comprising a rigid outer wall with at least one input and output lock or with at least one input and at least one output lock, and a substrate holder within said chamber with a substrate deposition plane, a vacuum pumping arrangement operationally connected to said chamber, and at least one lamp opposite said plane and freely accessible from said plane, wherein said lamp is configured to operate at a radiation spectrum band overlapping at least one of said absorption slope of said substrate and said absorption band, further comprising a gas tank operatively connected to said chamber via a controllable valve arrangement, said gas tank having an inert heat conducting gas therein.

46. The chamber of claim 45, wherein said inert gas is selected from one of argon and helium.

47. The chamber of claim 45, further comprising a control unit being operationally connected to said valve arrangement for disabling said gas to enter said chamber whenever said substrate is to be heated and for enabling flow of said gas into said chamber whenever said substrate is to be cooled down.

48. The chamber of claim 31, wherein said at least one lock is operatively connected to a central handler, said central handler being operationally connected to at least one further vacuum treatment process chamber.

49. The chamber of claim 48, wherein a control unit is operationally connected to said central handler, said heating chamber sand said at least one further process chamber, thereby controlling at least one of operation timing and of sequence of said central transport chamber, the further process chamber and the heating chamber.

50. The chamber of claim 49, wherein said control unit is configured to be freely programmable.

51. The chamber of claim 31, wherein said substrate holder is a holder for holding a flat substrate of at least 300 $cm^2$ flat surface area.

52. The chamber of claim 31, wherein said substrate holder is a holder for holding a flat substrate of at least 500 $cm^2$ flat surface area.

53. The chamber of claim 31, wherein said at least one lamp is one of a black lamp and of a carbon-radiator lamp.

54. The method of claim 4, further comprising introducing at least two of said substrates in back-to-back stack-position into said chamber.

* * * * *